June 30, 1970 — R. W. HUGHES — 3,517,754
ROCK DRILL BIT DRIVE

Filed Oct. 16, 1968 — 2 Sheets-Sheet 1

INVENTOR
ROBERT W. HUGHES
BY
Frank H. Thomas
ATTORNEY

June 30, 1970 R. W. HUGHES 3,517,754
ROCK DRILL BIT DRIVE
Filed Oct. 16, 1968 2 Sheets-Sheet 2

INVENTOR
ROBERT W. HUGHES
BY
*Frank H Thomson*
ATTORNEY

United States Patent Office 3,517,754
Patented June 30, 1970

3,517,754
ROCK DRILL BIT DRIVE
Robert W. Hughes, Easton, Pa., assignor to Ingersoll-Rand Company, New York, N.Y., a corporation of New Jersey
Filed Oct. 16, 1968, Ser. No. 767,970
Int. Cl. E21c 3/00
U.S. Cl. 173—104        19 Claims

ABSTRACT OF THE DISCLOSURE

A coupling for rotatably connecting a rock drill bit to a rock drilling machine. The drill bit and chuck of the drilling machine are provided with spaced apart longitudinal ribs with pins positioned between the ribs on the chuck and the ribs on the drill bit. These pins transfer torque from the chuck to the drill bit when the drilling machine is rotated on one direction. In the other direction of rotation, torque is transferred through the ribs.

BACKGROUND OF THE INVENTION

This invention relates to a coupling for rotatably connecting two members one of which is adapted to be reciprocated relative to the other. More particularly, the invention relates to a coupling for rotatably connecting a drill bit to a "downhole' drill or the shank piece of a cutting tool to an out of the hole drill such as a drifter. A "downhole" drill is a percussive mechanism such as that shown in U.S. Pat. No. 3,198,264 which follows the drill bit down the hole being drilled. The percussive mechanism delivers an impact to the drill bit and the downhole drill and drill bit are rotated by some means located out of the hole. The drill bit is operatively connected to the downhole drill so that it can rotate with the drill yet reciprocate relative to the drill.

In an out of the hole drill, the cutting tool is rotated by some means such as a motor mounted on the drill. The hammer of the drill delivers an impact to the cutting tool. The cutting tool must be able to reciprocate relative to the rotation providing mechanism.

Prior to this invention most drill bits and cutting tools were connected to the drill by means of a spline drive arrangement. The drill bit was provided with splines on its shank. A chuck having mating internal grooves telescopically received the drill bit and was secured to the drill. Rotation of the drill is transferred to the drill bit through the splines, and the splines permit the drill bit to reciprocate relative to the drill when it is hammered by the piston of the drill.

A spline drive between the drill and the bit has many disadvantages each of which becomes a greater problem as the power of the drill is increased. When the splines on the drill bit fit within the grooves in the chuck, metal to metal contact results. This metal to metal contact has a high coefficient of friction, and when the bit is reciprocated as it is struck by the hammer of the drill, a large amount of heat is generated. As the power of the drill is increased, the heat generated becomes so intense that the bit can be welded to the chuck, and hence destroys the usefulness of the bit. The metal to metal contact prohibits the supply of a sufficient amount of lubricant to reduce this intense heat.

Another disadvantage of a spline connection between the drill and bit is its weakness. Most splines are generally rectangular in cross-section. Rectangular construction results in stress risers in the metal which limits the load carrying capacity of the connection.

Since the splines are substantially inflexible, if the bit and chuck are misaligned, relatively few of the splines are used to transmit torque from the drill to the bit. This can lead to premature failure of the bit and is especially a problem as drill power increases. In addition, the solid splines provide little, if any, shock absorbing ability.

Arrangements for coupling a drill bit to a drill other than by means of splines have been attempted. One such arrangement is shown in U.S. Pat. No. 2,756,723. In that patent, pins are used to interconnect the drill bit and downhole drill. This arrangement presents the disadvantage that the pins which drivingly connect the drill bit and downhole drill are subjected to large shear forces. If the pins fail due to this shear force, the drill bit is no longer rotatively connected to the drill. This means that drilling operations must be discontinued and it becomes extremely difficult to remove the drill and drill bit from the hole since the drill bit must be rotated in order to easily remove it from the hole.

SUMMARY

It is therefore the principal object of this invention to provide a coupling between a rock drill bit and a rock drill which overcomes the above-mentioned disadvantages of prior couplings.

It is another object of this invention to provide a rotatable connection between a rock drill and a rock drill which provides a low coefficient of friction between the reciprocating bit and the drill.

It is a further object of this invention to provide a coupling which provides even distribution of the drive torque.

It is a still further object of this invention to provide a drive coupling for a drill bit which reduces stress concentrations normally associated with spline type couplings.

It is another object of this invention to provide a drive arrangement which permits replacement of individual coupling parts without necessitating replacement of the entire drill bit.

It is still another object of this invention to provide a drive coupling which, if failure of the torque transmitting means occurs, the drill bit may be removed from the hole being drilled.

The foregoing and other objects will, in general, be carried out by providing a rock drilling machine comprising: a casing, a movable cutting implement having a shank portion extending into said casing; a piston mounted for reciprocal movement in said casing and adapted to deliver an impact to said cutting implement; the shank portion having a plurality of circumferentially spaced, longitudinal ribs on its outer periphery; a hollow chuck removably secured to said casing and surrounding a portion of said shank portion for retaining said cutting implement in said casing; said chuck having a plurality of circumferentially spaced longitudinal grooves in its inner surface which are dimensioned to receive the ribs on said shank portion; and pins means positioned between the ribs on said shank portion and the grooves in said chuck for transferring torque from said casing to said cutting implement when said casing is rotated in at least one direction.

BRIEF DESCRIPTION OF THE DRAWINGS

The invention will be described in connection with the annexed drawings wherein.

DESCRIPTION OF THE PREFERRED EMBODIMENTS

Figure 1:
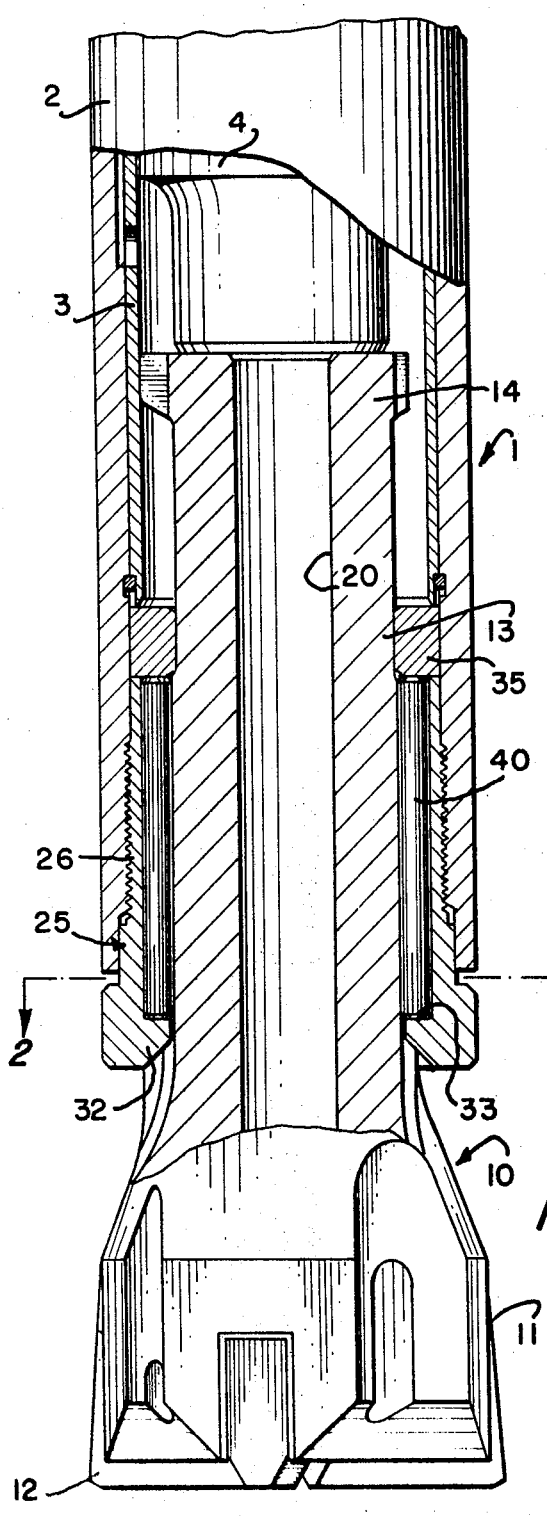
FIG. 1 is a generally sectional view of a portion of a downhole drill with a drill bit connected thereto by the coupling of this invention.
Figure 2:
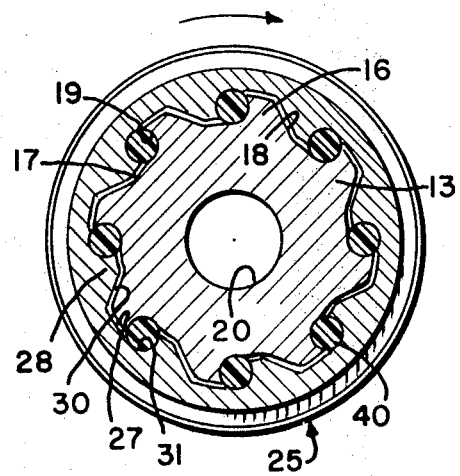
FIG. 2 is a sectional view of the coupling of this invention taken on the line 2—2 of FIG. 1 looking in the direction of the arrows.
Figure 3:
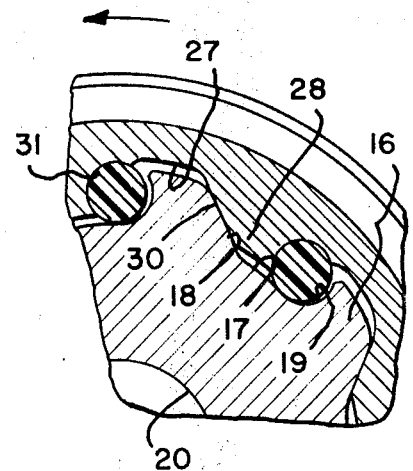
FIG. 3 is a fragmentary view similar to FIG. 2 but on an enlarged scale with the drill and drill bit being rotated in a direction opposite to that of FIG. 2.

Initially the invention will be described as it is applied to a downhole drill. Referring to FIGS. 1 to 3, a portion of a downhole rock drill is shown in FIG. 1 and is generally indicated at 1. The drill includes a casing 2 having a liner 3 mounted therein. A piston 4 is mounted for reciprocal movement within the sleeve 3. The hammer 4 may be reciprocated by any suitable means such as by a source of fluid under pressure and valving such as that shown in U.S. Pat. No. 3,198,264. As the hammer reciprocates it delivers an impact to a drill bit generally indicated at 10. The drill is rotated by suitable means (not shown) located out of the hole being drilled.

The drill bit is held in the drill by a chuck generally indicated at 25 which is removably attached to the casing 2 such as by threads 26.

As is well known in the art during operation of the drill, as the piston 4 delivers an impact to the bit 10, the bit must be free to reciprocate relative to the drill 1 and chuck 25 and rotate with the drill 1. By this invention I have provided a novel coupling which secures the drill bit to the drill to permit rotation of the drill bit with the drill and reciprocation of the drill bit relative to the drill.

The drill bit 10 includes a working end 11 having suitable hardened inserts 12 at one end. A shank portion 13 is connected to the working end 11 and has at its upper end a portion 14 adapted to be struck by the hammer 4. A longitudinal passage 20 is provided for conducting fluid under pressure to the bottom of the hole for blowing cuttings out of the hole as is well known in the art. As shown in FIGS. 2 and 3, the shank portion 13 of the bit 10 includes a plurality of circumferentially spaced, longitudinal projections or ribs 16 on its outer periphery. The spaces between the ribs 16 have been designated 17. These ribs 16 are shaped so that one side 18 extends from the outer surface toward the shank at an angle of less than 90°. This angle is not intended to be limiting but does provide the advantage of reducing stress concentrations in the ribs and hence reducing the tendency to fracture. The other side of the ribs 16 is provided with an arcuate cut out portion 19 which extends into the space 17.

The chuck 25 is dimensioned to telescopically receive the drill bit 10. The inside of the chuck 25 is provided with a plurality of spaced apart internal grooves 27 on its inner surface. The groves 27 define a plurality of ribs 28. The grooves 27 are shaped so that the ribs 28 are substantially a mirror image of the ribs 16 on the shank 13. The internal grooves 27 include one side 30 which is at an angle less than 90°. from the base of the groove to the top of the rib 28 and the other side of the groove 27 is provided with an arcuate cut out portion 31. As is the case with the ribs 16 on the shank 13, this shape tends to reduce stress risers which accompany square spines.

Although the ribs 28 of the chuck 25 are similar in shape to the ribs 16 of the drill bit 10, the grooves 27 of the chuck 25 are dimensioned slightly larger than the ribs 16 of the drill bit and the ribs 28 of the chuck 25 are slightly smaller than the spaces 17 of the drill bit 10 so that if the chuck and drill bit are exactly aligned, there is no metal to metal contact between the chuck and drill bit.

A plurality of pins 40 made of a suitable bearing material and preferably a non-metallic material such as nylon or plastic are placed within the area defined by the arcuate portion 19 and 31. These pins 40 provide the drive connection and the torque transferring means between the chuck 25 and the drill bit 10 as well as permitting reciprocation of the bit relative to the drill. The chuck 25 is provided with a flange 32 which defines a shoulder 33 adapted to hold the pins 40 and prevent them from sliding out of the bottom of the chuck 25. A split ring 35 is placed over the top of the chuck and received by the casing 2 to prevent the pins 40 from moving out of the top of the chuck 25 as the bit reciprocates. The split ring 35 is conventional and need not be described in detail.

For purposes of illustration, it will be assumed that the drill is rotated in the clockwise direction when the hole is being drilled and a counterclockwise direction when the drill and bit are being removed from the hole. Since the chuck 25 is secured to the drill, when the drill is rotated, the chuck is also rotated. Rotation of the drill is transferred from the chuck 25 to the drill bit 10 by means of the pins 40 as shown in FIG. 2. The shape of the ribs 16 with the cut outs 19 and grooves 27 with their cut outs 31 and the positioning of the pins 40 is such that the pins 40 are placed substantially completely in compression. The rotation of the chuck 25 does not tend to cause the pins 40 to be sheared.

The use of a non-metallic material which has a low coefficient of friction in construction of the pins 40 and the absence of metal to metal contact between the bit and the chuck reduces friction when the bit is being reciprocated relative to the drill. The reduction in friction reduces heat output and the absence of metal to metal contact eliminates the possibility of welding the drill bit to the chuck. The non-metallic pins and the lack of metal to metal contact permits a reduction of friction even under conditions of high loading and marginal lubrication. Thus a higher powered drill may be used without fear of permanent damage to the drill bit through increased heat.

When it is desired to remove the bit from the hole being drilled or if it is desired to remove the chuck from the drill and hence remove the drill bit, the chuck will be rotated in a counterclockwise direction. As shown in FIG. 3, torque will be transferred from the chuck to the drill bit through angular sides 18 and 30 of the bit 10 and chuck 25, respectively. The metal to metal contact which occurs in this instance is not damaging since this will occur for a very short period of time and under low power conditions. The use of metal to metal contact during reverse rotation does present the advantage that if for some reason the pins were to be damaged, the bit can be removed from the hole. This would not be possible if the pins were used to transfer torque in both directions of rotation.

Figure 4:
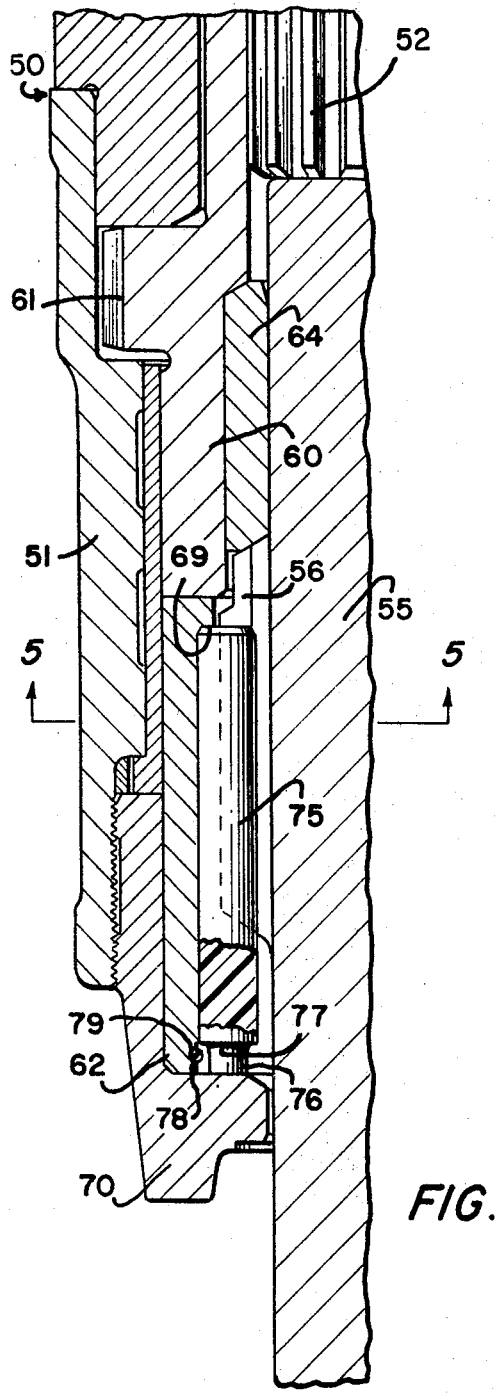
FIG. 4 is a sectional view of a portion of a rock drilling machine such as a drifter with a cutting tool connected thereto by the coupling of this invention.
Figure 5:
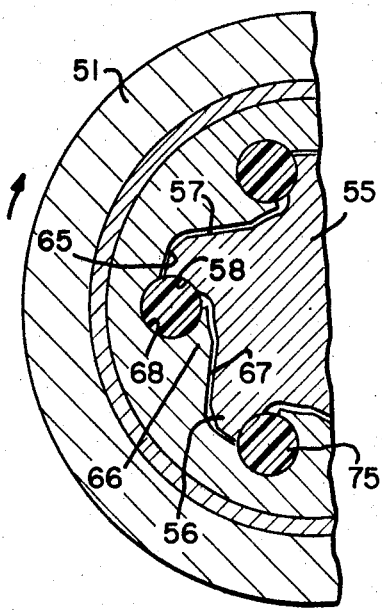
FIG. 5 is a sectional view of the coupling of this invention as applied to a drifter and taken on the line 5—5 of FIG. 4.

Referring now to FIGS. 4 and 5, the coupling of the present invention will be described in connection with an out of tht hole drill such as a drifter. The drill includes a casing, generally indicated at 50, having a fronthead 51. A hammer 52 is mounted for reciprocal movement within the casing and is adapted to be reciprocated by any suitable means such as air under pressure. A cutting implement having a shank piece 55 extends into the casing. As the hammer 52 reciprocates, it delivers an impact to the shank 55 of the cutting tool.

A suitable motor means (not shown) may be mounted on the drill for rotating the cutting tool 55. A chuck 60 having gear teeth 61 is rotatably mounted in the fronthead 51. The chuck 60 is adapted to be rotated by the motor means. The rotary motion of the chuck 60 is transferred to a forward chuck piece 62 which surrounds the shank of the cutting tool 55. A bushing 63 is mounted in the fronthead 51 to permit free rotation of the chuck 61, 62. A shank aligner 64 surrounds the cutting tool and is positioned in the chuck 60 to insure accurate alignment of the cutting tool 55. A retainer ring 70 holds the chuck in place and prevents the tool 55 from coming out of the drill. The shank of the cutting tool 55 is provided with a plurality of circumferentially spaced longitudinal projections or ribs 56 on its outer periphery. These ribs, like those in the embodiment of FIGS. 1 to 3, are shaped so that one side 57 extends from the outer surface toward the shank at an angle of less than 90°. The other side of the rib 56 is provided with an arcuate cut out 58.

The chuck piece 62 is dimensioned to telescopically receive the cutting tool 55. The inside of the chuck is provided with a plurality of circumferentially spaced longitudinal grooves 65 which define a plurality of ribs 66. The grooves 65 include one side 67 which is at an angle of less than 90° from the base of the groove to the top of the rib 66. The other side of the groove 65 is provided with an arcuate cut out 68, the surface of which preferably extends more than 180°. A plurality of non-metallic pins 75 having a reduced diameter end 76 are placed in the area defined by the arcuate portions 58 and 68 for transferring torque from the chuck piece 62 to the tool 55.

In assembling the embodiment of FIGS. 4 and 5, the retainer ring 70 and tool 55 are out of the drill. The pins 75 are placed in the cut outs 68. Since the cut outs 68 extend more than 180°, the pins will be held in place and the only movement of the pins 75 which can occur is a movement parallel to the longitudinal axis of the chuck piece 62.

A retaining ring 78 is fit into an annular seat 79 in the chuck piece 62. This ring prevents the pins 75 from falling out of the cut outs 68 since the shoulder 77 defined by the reduced diameter portion 76 will not clear the ring. The shank of the tool 55 is then fit in place, and the retainer ring 70 is threadedly secured to the fronthead 51. Upward movement of pins 75 is limited by a shoulder 69.

In operation, the embodiment of FIGS. 4 and 5 is substantially the same as the embodiment of FIGS. 1 to 3. The pins 75 transfer torque from the chuck piece 62 to the tool 55 in the drilling direction of rotation. In the reverse direction of rotation, torque is transferred through sides 57 and 67 of projections 56 and grooves 65, respectively. In both directions of rotation, the cutting tool 55 is able to reciprocate relative to the chuck.

From the foregoing it is apparent that the objects of this invention have been carried out. If failure of the drive coupling occurs, the entire bit is not destroyed. The pin drive arrangement permits replacement of the pins should any one or more of the pins fail. This is opposed to a standard spline drive arrangement which, if failure of the spline occurs, the usefulness of the entire drill bit is destroyed. The use of non-metallic pins provides the further advantage that should alignment between the chuck and the bit not be exact, the non-metallic pins are capable of being flexed a slight amount. This flexing allows each of the pins and each of the ribs and grooves to transmit torque. This is opposed to a standard spline drive arrangement where a limited number of the keys will transmit torque if exact alignment is not provided. The non-metallic pins also tend to dampen vibrations which may occur between the drill and drill bit. A coupling for a rock drill has been provided which will reduce friction by interposing a material having a low coefficient of friction between the bit and chuck by substantially eliminating metal to metal contact during drilling to thereby lessen the tendency of the drill bit to be welded to the chuck. Thus, a coupling has been provided which permits the power of the rock drill to be increased which will result in faster drilling.

I claim:

1. A coupling for rotatably connecting a pair of axially aligned members comprising:
   a first generally cylindrical member having a plurality of circumferentially spaced projections on its outer periphery;
   a second generally cylindrical hollow member dimensioned to telescopically receive said first member and having a plurality of circumferentially spaced internal grooves on its inner periphery;
   said internal grooves telescopically receiving said projections; and
   pin means positioned between said first member and said second member for transferring torque from one member to the other in at least one direction or rotation and including a plurality of elongated pins each positioned between one of the projections on the first member and one sidewall of one of the grooves on the second member.

2. The coupling of claim 1 wherein said pin means is non-metallic.

3. The coupling of claim 1 wherein the projections on said first and the grooves on said second member are dimensioned so that there is substantially no contact between said first and second members in one direction of rotation.

4. The coupling of claim 3 wherein the projections on said first and the grooves in said second member are shaped so that torque is transferred from one member to the other through said projections and grooves in the other direction of rotation.

5. The coupling of claim 4 wherein said pin means is cylindrical and said projections include an arcuate portion for receiving said pin means.

6. The coupling of claim 5 wherein said pin means is non-metallic.

7. A movable cutting implement for a rock drilling device having a work head and a shank portion connected thereto, said shank portion being provided with a plurality of circumferentially spaced projections on its outer periphery, each of said projections having a cut out in one side thereof for receiving a portion of an elongated pin means.

8. The cutting implement of claim 7 wherein the other side of said projection extends from the outer surface of the projection toward the shank at an angle of less than 90°.

9. The cutting implement of claim 8 wherein said cut out is arcuate in configuration for receiving a portion of said pin means.

10. A chuck for a rock drilling device comprising:
    a hollow generally cylindrical member; and
    a plurality of circumferentially spaced internal grooves on the inside of said cylindrical member;
    each of said grooves having a cut out in one side thereof for receiving a portion of an elongated pin means.

11. The chuck of claim 10 wherein the other side of said groove extends from the base of the groove toward the top of the groove at an angle of less than 90°.

12. The chuck of claim 11 wherein said cut out is arcuate in configuration for receiving a portion of said pin means.

13. The chuck of claim 12 wherein said arcuate cut out has a surface of more than 180°.

14. The chuck of claim 13 further comprising means for retaining said pin means within the chuck.

15. A rock drilling machine comprising:
    a casing;
    a movable cutting implement having a shank portion extending into said casing;
    a piston mounted for reciprocal movement in said casing and adapted to deliver an impact to said cutting implement;
    the shank portion having a plurality of circumferentially spaced, longitudinal ribs on its outer periphery;
    a hollow chuck removably secured to said casing and surrounding a portion of said shank portion for retaining said cutting implement in said casing;
    said chuck having a plurality of circumferentially spaced, longitudinal grooves in its inner surface which are dimensioned to receive the ribs on said shank portion; and
    pin means positioned between the ribs on said shank portion and the grooves in said chuck for transferring torque from said casing to said cutting implement when said casing is rotated in at least one direction.

16. The drilling machine of claim 15 wherein one side of each of the ribs on said shank portion has an arcuate cut out for receiving a portion of said pin means.

17. The drilling machine of claim 16 wherein said pins are non-metallic.

18. The drilling machine of claim 17 wherein the grooves in said chuck are larger than the ribs on the shank of said cutting implement.

19. The drilling machine of claim 15 wherein the ribs on said shank and the grooves in said chuck are shaped so that when said casing is rotated in one direction, torque is transferred to said cutting implement through said pin means and when said casing is rotated in the other direction, torque is transferred to said cutting implement through said ribs.

References Cited

UNITED STATES PATENTS

| 1,745,166 | 1/1930 | Hansen | 173—105 X |
| 1,787,229 | 12/1930 | Zimmermann | 279—19.4 |
| 3,183,684 | 5/1965 | Zeidler | 64—27 XR |
| 3,232,362 | 2/1966 | Cullen et al. | 64—27 XR |

FOREIGN PATENTS 1,008,063   5/1957   Germany.

ERNEST R. PURSER, Primary Examiner

U.S. Cl. X.R.

64—27; 279—19.3